(12) United States Patent
Hendriks et al.

(10) Patent No.: US 7,067,238 B2
(45) Date of Patent: Jun. 27, 2006

(54) METHOD FOR MANUFACTURING A SUBSTRATE FOR USE IN A STAMPER MANUFACTURING PROCESS, AS WELL AS A SUBSTRATE OBTAINED BY USING SUCH A METHOD

(75) Inventors: Christian Etienne Hendriks, Eindoven (NL); Roland Anthony Tacken, Eindhoven (NL)

(73) Assignee: Singulus Mastering B.V., Eindhoven (NL)

( * ) Notice: Subject to any disclaimer, the term of this patent is extended or adjusted under 35 U.S.C. 154(b) by 0 days.

(21) Appl. No.: 10/312,085

(22) PCT Filed: Jun. 25, 2001

(86) PCT No.: PCT/NL01/00472

§ 371 (c)(1),
(2), (4) Date: May 1, 2003

(87) PCT Pub. No.: WO02/09103

PCT Pub. Date: Jan. 31, 2002

(65) Prior Publication Data

US 2004/0091721 A1     May 13, 2004

(30) Foreign Application Priority Data

Jun. 26, 2000    (NL) .................................... 1015524

(51) Int. Cl.
*G03C 5/56*    (2006.01)
(52) U.S. Cl. ..................... 430/320; 321/945
(58) Field of Classification Search ............... 490/320, 490/321, 945

See application file for complete search history.

(56) References Cited

U.S. PATENT DOCUMENTS

| | | | |
|---|---|---|---|
| 4,316,279 A * | 2/1982 | Russell et al. | 369/109.01 |
| 4,970,134 A * | 11/1990 | Bronstert et al. | 430/271.1 |
| 5,605,782 A | 2/1997 | Put et al. | 430/321 |
| 5,783,371 A | 7/1998 | Bifano | 430/321 |
| 5,790,512 A | 8/1998 | Put et al. | 369/275.4 |
| 6,159,664 A | 12/2000 | Reuhman-Huisken et al. | 430/321 |
| 2001/0000746 A1 | 5/2001 | Edwards | 430/321 |
| 2001/0016301 A1 | 8/2001 | Edwards | 430/321 |

FOREIGN PATENT DOCUMENTS

| | | | |
|---|---|---|---|
| EP | 0596439 A2 | | 5/1994 |
| EP | 0660314 | * | 6/1995 |
| EP | 0667608 | * | 8/1995 |
| JP | 58077044 | | 5/1983 |
| JP | 02-162716 | * | 6/1990 |
| JP | 02-204023 | * | 8/1990 |
| JP | 2000-021033 | * | 1/2000 |
| WO | 97/37348 | * | 10/1997 |
| WO | WO 99/18572 | | 4/1999 |
| WO | 99/52105 | * | 10/1999 |

\* cited by examiner

*Primary Examiner*—Martin Angebranndt
(74) *Attorney, Agent, or Firm*—Pillsbury Winthrop Shaw Pittman LLP

(57) ABSTRACT

A method for manufacturing a substrate for use in a stamper manufacturing process and a substrate which is used in stamper manufacturing process to be used in producing optical discs, includes exposing, developing and heating of a photosensitive film that has been coated onto a substrate.

21 Claims, 2 Drawing Sheets

METHOD FOR MANUFACTURING A SUBSTRATE FOR USE IN A STAMPER MANUFACTURING PROCESS, AS WELL AS A SUBSTRATE OBTAINED BY USING SUCH A METHOD

This application is the National Phase of PCT/NL01/00472, filed on Jun. 25, 2001, and published as WO 02/09103, which claims priority to Netherlands Application No. 1015524, filed Jun. 2, 2000, the contents of both are incorporated herein by reference.

BACKGROUND OF THE INVENTION

1. Field of the Invention

The present invention relates to a method for manufacturing a substrate according to the precharacterizing portion of claim 1 and furthermore relates to a substrate according to the precharacterizing portion of claim 18 and to a method for manufacturing a stamper to be used in producing optical discs, comprising the exposing, developing and heating of a photosensitive film that has been coated onto a substrate.

2. Description of the Related Art

From JP-58-077044 there is known a method for enhancing the contact intensity of a photoresist film by producing a crosslinking reaction after applying a thin photoresist coating to a glass substrate or to a reflective film present on the substrate. Thus a reflective film is first formed on a glass substrate, after which a photoresist film is coated thereon in a thickness of about 100 Å. By increasing the temperature, a cross-linking reaction is produced between said two films, and a photoresist film having a thickness of about 1,000 Å is coated onto the thus cross-linked films, followed by exposure and development thereof. The said publication does not provide any information as regards the influence of the crosslinked undercoating on the photoresist film that is finally to be exposed and developed.

Optical discs contain information that is recorded in a geometric structure. More in particular, said geometric structure consists of pits and lands, which pits are arranged in concentrical circles or in a spiral in a surface of a respective optical disc. Also grooves are used as the structure of optical discs. When large numbers of such optical discs are to be produced, however, a stamper is placed in the mould of, an injection moulding machine, after which the optical discs are finally metallized and provided with a protective lacquer and a label or print.

The stamper manufacturing process as referred to in the introduction is known per se from the prior Dutch patent applications nos. 9400225 and 1007216 filed in the name of the present applicant, according to which process an unstructured stamper plate is prepared, which preparation comprises the cleaning died possible coating of an adhesion layer for the photoresist that is yet to be coated Subsequently, a negative photoresist is coated unto a thus prepared, unstructured stamper plate, which photoresist is selectively exposed to laser light, after which the selectively exposed photoresist film is heated and subsequently integrally exposed. Finally the integrally exposed photoresist is developed so as to provide the structured photoresist film, which is subsequently healed. In the direct stamper recording (DSR) process that is currently used, in respect of which the present applicant was granted Dutch patent no. 1009106 before, a stamper is formed directly on a nickel substrate by means of a galvanic process. The substrate that is used thereby actually consists of a circular nickel disc having a diameter of about 200 μm and a thickness of about 300 μm, onto which disc a novolak-based photoresist has been coated, using an adhesion layer. The function of said adhesion layer, which, on account of its thickness, can only be considered to be a "monolayer", is to form a suitable surface onto which the novolak-based photoresist can be coated. In the subsequent step of the DSR process, the photoresist film that has been coated onto the substrate is selectively exposed by means of laser light, and subsequently heated and integrally exposed. Following the developing step, removal of the photoresist takes place, with the exception of the photoresist posts that remain behind on the nickel substrate. Said photoresist posts are subsequently hardened by using all exposure step with a wavelength in the deep UV region, followed by a heating step at a high temperature (hard bake) so as to strengthen the exposed, and thus crosslinked, regions additional by further crosslinking of polymer chains. A stamper obtained by using such a method thus comprises a nickel shell including photoresist posts. Further hardening of the photoresist posts makes it possible to produce at least 5000 replicas by means of such a stamper, which is used in the mould of an injection moulding machine for mass-producing CD replicas.

Research has shown that defects, such as stripes and stains, may be introduced on the surface of the nickel substrate during the galvanic process. In some cases said defects can be detected on an unprocessed nickel substrate by means of halogen light. After the above-described processing steps in the DSR process, however, such defects will show up. This phenomenon is assumed to be caused by a local difference in the diffraction pattern, which pattern is formed by the structure of photoresist posts. Not only the human eye is very sensitive to differences in the diffraction pattern, but also the electric signal from the stamper can be influenced by the quality of the substrates.

Additional research has moreover shown that standing waves occur in the photoresist film during the exposure step of the stamper manufacturing process. Said standing waves, which are caused by reflection of the substrate, result in the occurrence of alternating high and low exposure energy levels in the thickness of the resist, as a result of which photoresist posts of irregular shape and dimensions are eventually obtained, which is undesirable.

SUMMARY OF THE INVENTION

The object of the present invention is thus to manufacture a substrate for use in a stamper manufacturing process, in particular in the DSR process, wherein the quality of the substrate in the stamper that is eventually produced is of secondary importance.

Another object of the present invention is to provide a stamper, which stamper has an extended technical life span in comparison with the DSR stampers that are currently commercially available.

Another object of the present invention is to provide a method for manufacturing a substrate for use in a stamper manufacturing process, wherein it is possible to abandon the monolayer that is currently being used as an adhesive.

Yet another object of the invention is to provide a method for manufacturing a substrate for use in a stamper manufacturing process, which method is carried out in such a manner that the negative effect of standing waves, in particular the position of the interference curve, on the formation of the photoresist posts is minimized.

The method as referred to in the introduction is according to the present invention characterized in that the thickness of the crosslinked undercoating of step b) is selected so that the maximum energy intensity during the exposure step of the stamper manufacturing process occurs at the desired post height of the top coating that is to be developed.

As already said before, the light that falls onto the substrate undergoes an endless number of reflections at the interface between the resist and the surrounding atmosphere, and also at the interface between the resist and the substrate. Said entering and exiting light waves interfere in the resist, and a so-called interference curve is formed, which interference leads to a variation in the intensity of the energy that the resist receives across the thickness of the film layer. By selecting the thickness of said undercoating, in accordance with the present invention, so that the maximum energy intensity during the exposure step of the stamper manufacturing process occurs at the desired post height of the photoresist posts of the top coating that is to be developed, the position of the interference curve is shifted so that the maximum value of the destructive interference does not occur in the region of the desired post height. Thus a top coating is obtained from which reproducible photoresist posts having a desired height and a desired shape can be obtained.

A novolak-based photoresist is preferred as said suitable, crosslinkable chemical composition. In addition to that it is also possible in specific embodiments to use a material which comprises novolak, for example pure novolak.

It is in particular preferred to carry out step b) by using a heat treatment, in particular at a temperature ranging from 150–250° C. Such a temperature range will result in three-dimensional crosslinking of the polymer chains of the chemical composition provided in step a), which undercoating will mask any defects in the substrate.

According to a special embodiment of the present method, step b) is carried out by using an exposure step, in particular in the wavelength range of 200–320 nm.

The exposure time is in particular 5–180 seconds, whereby the exposure step is carried out In particular while rotating and/or heating the substrate. Since the crosslinkable chemical composition has undergone a crosslinking reaction in step b), the thus crosslinked composition is not soluble, or only to a small degree, in the solvent that is used in the photosensitive material that has been provided in step c).

According to the present method, the top coating is subjected to a heat treatment in an additional step d), which step d) is carried out at such a temperature that no crosslinking of the photosensitive material that has already been applied in step c) will take place. This means that step d) is in particular carried out at a temperature of maximally 130° C. The solvent that is present in the top coating is removed by carrying out step d).

For the present invention it is in particular important that no crosslinking reaction will take place in the top coating of the photosensitive material, because said top coating will be structured in the further DSR process so as to form the above-described photoresist posts.

In a special embodiment it is desirable to subject the substrate to a preparation step prior to carrying out step a), which preparation step comprises the cleaning of the substrate and possibly the application of an adhesion layer for the crosslinkable chemical composition that is to be applied in step a).

The object of such a preparation step is in particular to improve the adhesion between the substrate and the undercoating that is to be provided in step a), whereby the undercoating is thus present on the adhesion layer that has been applied to the substrate previously.

Preferably, a metal is used for the substrate, in particular nickel.

In order to obtain layers having a uniform thickness, it is preferred to carry out step a) as well as step c) by means of a spin-coating process, whereby the crosslinkable chemical composition that is coated onto the substrate in step a) may be the same as the photosensitive material that is applied in step c).

The present invention furthermore relates to a substrate according to the precharacterizing portion of claim 18, which substrate is characterized in that the thickness of the crosslinked undercoating of step b) has been selected so that the maximum energy intensity during the exposure step of the stamper manufacturing process occurs at the desired post height of the top coating that is to be developed. In particular the thickness of said undercoating is in the order of 10–100 nm and wherein the thickness of the top coating is in the order of 150–250 nm, preferably 150–200 nm. The height of the photoresist posts is preferably 100–150 nm, in particular 120–130 nm.

The present substrate is in particular suitable for use in a method for manufacturing a stamper, which stamper is placed in the mould of an injection moulding machine for mass-producing CD replicas, and such a method comprises the exposing, developing and heating of the photosensitive layer which has been coated onto the substrate in step c).

The present invention will be explained in more detail hereafter with reference to a number of figures, which figures should not be taken to be limitative, they merely function to illustrate the present invention.

DETAILED DESCRIPTION

Figure 1:
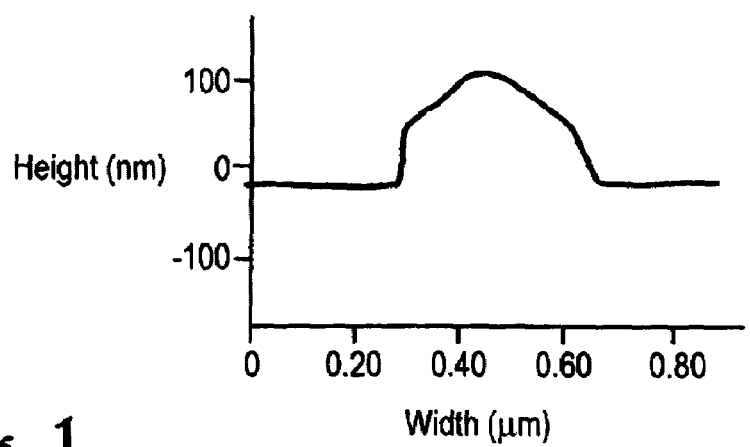
FIG. 1 shows the shape of a photoresist post as obtained by using a substrate not provided with an undercoating.

FIG. 1 shows an example of a photoresist post wherein the standing wave effect as measured by means of AFM is clearly visible. The nickel substrate was provided with a photoresist having a thickness of 165 nm, the height of the photoresist posts obtained after exposure and development is 129 nm. Due to the absence of an undercoating, a photoresist post of highly irregular shape has been obtained, which is undesirable in practice.

Figure 2:
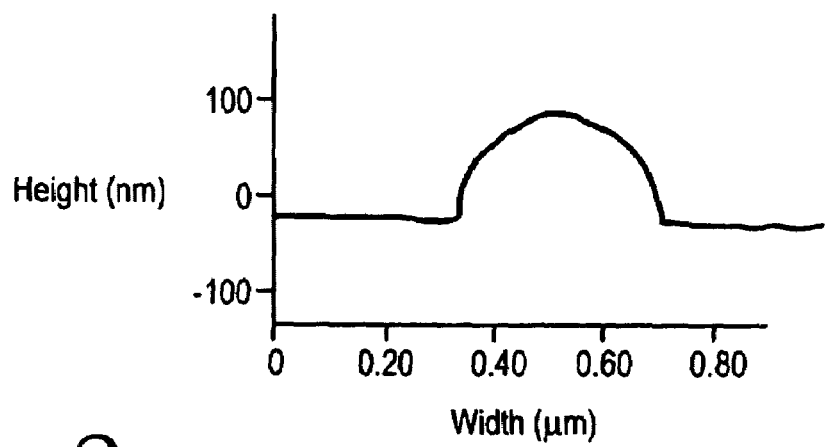
FIG. 2 shows the shape of another photoresist post as obtained by using a substrate not provided with an undercoating.

FIG. 2 schematically shows a photoresist post wherein the standing wave effect as measured by means of AFM is clearly visible. Present on the nickle substrate was a photoresist film having a thickness of 165 nm, with the height of the photoresist post being 121 nm. FIG. 2 clearly shows that a photoresist post of erratic dimensions is obtained if no undercoating is used.

Figure 3:
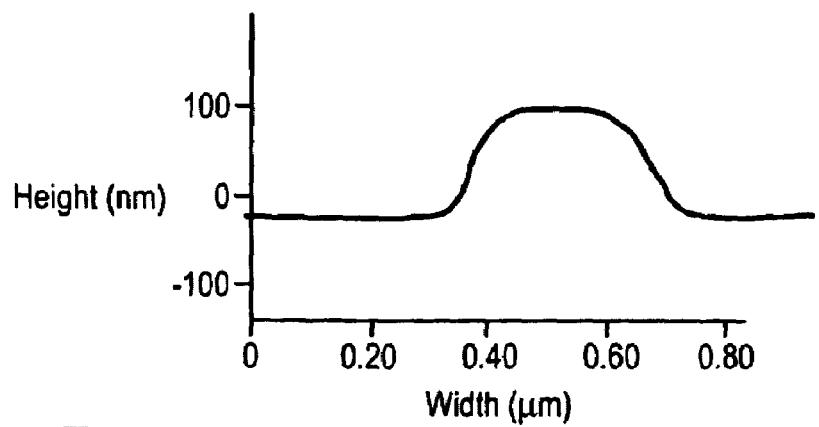
FIG. 3 shows the shape of a photoresist post as obtained by using a substrate provided with an undercoating.

FIG. 3 schematically shows a photoresist post wherein a nickel substrate having an undercoating of 30 nm and a resist layer of 185 nm was used. The height of the photoresist post was 122 nm. From this schematic illustration it is apparent that the use of an undercoating of the desired thickness has resulted in a shift of the position of the interference curve, which new position has led to a reproducible, smooth photoresist post.

Figure 4:
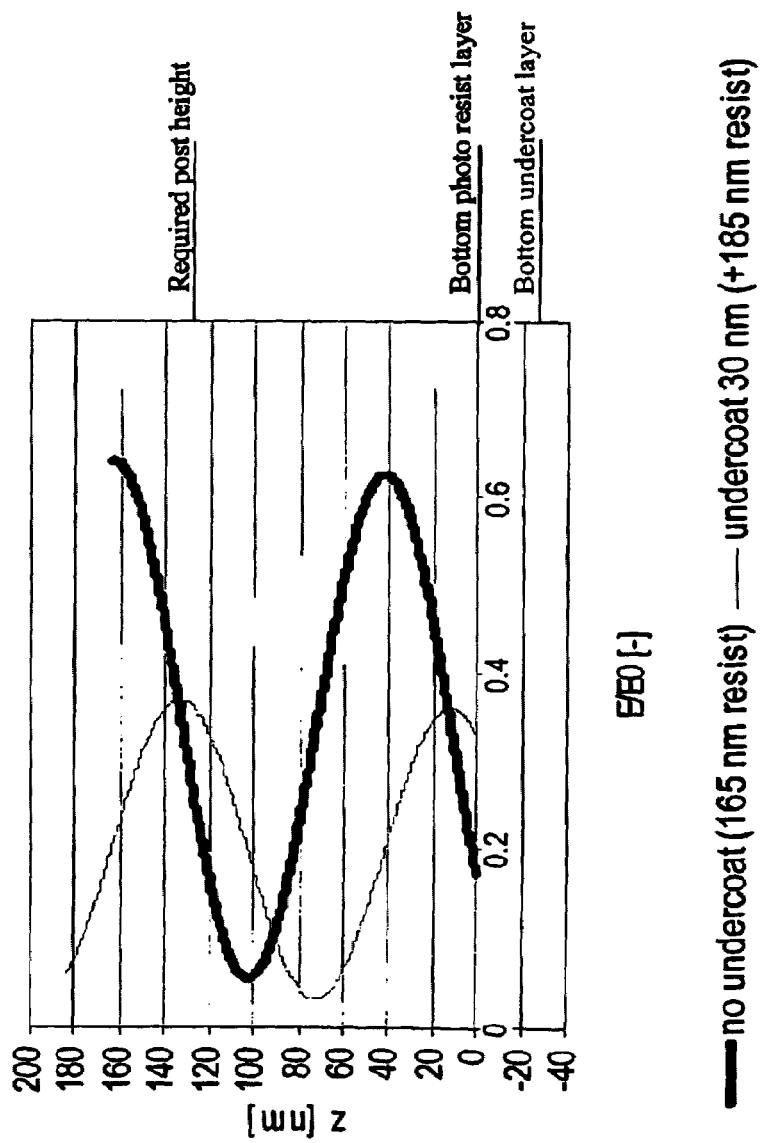
FIG. 4 shows the interference curve of two embodiments, in particular of a substrate comprising an undercoating and of a substrate which does not comprise an undercoating.

FIG. 4 shows the shift of the interference curve resulting from the use of an undercoating on a substrate. Set off on the vertical axis is parameter z, which parameter indicates the distance perpendicularly to the substrate, wherein the value z–0 corresponds to the substrate area. Set off on the horizontal axis is the energy intensity, wherein $E_0$ is the intensity at the resist surface, which has value 1. From FIG. 4 it follows that the use of an undercoating having a thickness of 30 nm has resulted in a shift of the position of the interference curve, wherein the maximum energy intensity occurs in particular in the region of the desired height of the photoresist post, viz. 120–130 nm.

What is claimed is:

1. A method for manufacturing a substrate for use in a stamper manufacturing process, comprising:
    a) coating a crosslinkable chemical composition onto the substrate to form an undercoating;
    b) subjecting the undercoating applied in a) to a crosslinking reaction; and
    c) applying a top coating of a photosensitive material with a predetermined thickness to the undercoating that has been crosslinked in b), which top coating is exposed and developed in the stamper manufacturing process after which posts having a desired height being less than the predetermined thickness of the top coating remain,
    wherein the thickness of the crosslinked undercoating of b) is selected so that a maximum energy intensity during exposure in the stamper manufacturing process occurs in the top coating at the desired height of the posts.

2. A method according to claim 1, wherein a novolak based photoresist is used as said crosslinkable chemical composition.

3. A method according to, claim 1, further comprising:
    d) subjecting the top coating applied in c) to a heat treatment.

4. A method according to claim 3, wherein d) is carried out at such a temperature that no crosslinking of the photosensitive material that has been applied in c) takes place.

5. A method according to claim 4, wherein d) is carried out at a temperature of 130° C. maximum.

6. A method according to claim 1, wherein b) is carried out by using a heat treatment.

7. A method according to claim 6, wherein the heat treatment is carried out at a temperature ranging from 150–250° C.

8. A method according to claim 1, wherein b) is carried out by exposure.

9. A method according to claim 8, wherein said exposure is carried our in the wavelength range of 200–320 nm.

10. A method according to claim 8, wherein an exposure time is 5–180 seconds.

11. A method according to claim 8, wherein said exposure is carried out while rotating the substrate.

12. A method according to claim 8, wherein said exposure is carried out while heating the substrate.

13. A method according to claim 1, wherein a layer thickness of 10–100 nm is used for said undercoating in a).

14. A method according to claim 1, wherein a layer thickness of 150–250 nm is used for the top coating in c).

15. A method according to claim 1, wherein the substrate is subjected to a preparation prior to carrying our a), which preparation comprises cleaning of the substrate.

16. A method according to claim 15, wherein the preparation further comprises application for an adhesion layer for the crosslinkable chemical composition that is to be applied in a).

17. A method according to claim 1, wherein a metal is used for the substrate.

18. A method according to claim 17, wherein the metal is nickel.

19. A method according to claim 1, wherein the crosslinkable chemical composition that is coated onto the substrate in a) is the same as the photosensitive material that is applied in c).

20. A method according to claim 1, wherein a) and c) are carried out by a spin-coating process.

21. A method according to claim 1, wherein a layer thickness of 150–200 nm is used for the top coating in c).

* * * * *